(12) United States Patent
Papadimitriou

(10) Patent No.: US 11,515,748 B2
(45) Date of Patent: Nov. 29, 2022

(54) COOLED HOUSING

(71) Applicant: GF Casting Solutions AG, Schaffhausen (CH)

(72) Inventor: Ilias Papadimitriou, Buettenhardt (CH)

(73) Assignee: GF CASTING SOLUTIONS AG, Schaffhausen (CH)

( * ) Notice: Subject to any disclaimer, the term of this patent is extended or adjusted under 35 U.S.C. 154(b) by 230 days.

(21) Appl. No.: 16/734,462

(22) Filed: Jan. 6, 2020

(65) Prior Publication Data
US 2020/0227970 A1    Jul. 16, 2020

(30) Foreign Application Priority Data

Jan. 15, 2019  (EP) ..................................... 19151887

(51) Int. Cl.
| | | |
|---|---|---|
| *H02K 9/19* | (2006.01) | |
| *H02K 5/20* | (2006.01) | |
| *H02K 9/00* | (2006.01) | |
| *H02K 9/26* | (2006.01) | |

(52) U.S. Cl.
CPC ................. *H02K 5/20* (2013.01); *H02K 9/00* (2013.01); *H02K 9/26* (2013.01)

(58) Field of Classification Search
CPC .. H02K 5/20; H02K 9/00; H02K 5/02; H02K 15/14; H02K 9/19; H02K 1/27
See application file for complete search history.

(56) References Cited

U.S. PATENT DOCUMENTS

| | | | | |
|---|---|---|---|---|
| 5,220,233 A | * | 6/1993 | Birch | H02K 1/2733 310/156.28 |
| 5,859,482 A | * | 1/1999 | Crowell | H02K 5/20 310/58 |
| 7,322,103 B2 | * | 1/2008 | Burjes | F28F 3/12 29/890.035 |
| 8,183,723 B2 | * | 5/2012 | Fee | H02K 5/20 310/64 |
| 9,331,551 B2 | * | 5/2016 | Ikeda | H02K 5/203 |
| 2005/0285456 A1 | * | 12/2005 | Amagi | H02K 5/08 310/43 |
| 2009/0026857 A1 | * | 1/2009 | Lavall | H02K 5/20 310/58 |

FOREIGN PATENT DOCUMENTS

| | | |
|---|---|---|
| CN | 107947510 A | 4/2018 |
| DE | 102005052361 A1 | 5/2007 |
| DE | 102005052363 A1 | 5/2007 |
| DE | 102015109121 A1 | 12/2016 |
| JP | H 08205474 A | 8/1996 |

* cited by examiner

*Primary Examiner* — Leda T Pham
(74) *Attorney, Agent, or Firm* — Leydig, Voit & Mayer, Ltd.

(57) ABSTRACT

An electric motor housing with cooling includes: a housing, the housing having a round cross-section, an outer shell, a terminating wall and an inner shell, the housing being formed as a one-piece lightweight metal cast component. A cooling gap is formed between the outer shell and the inner shell and a spiral-shaped element is arranged in the cooling gap. The spiral-shaped element includes a spiral-shaped cooling channel which runs between the windings of the spiral-shaped element.

17 Claims, 3 Drawing Sheets

COOLED HOUSING

CROSS-REFERENCE TO PRIOR APPLICATION

Priority is claimed to European Patent Application No. EP 19 151 887.7, filed on Jan. 15, 2019, the entire disclosure of which is hereby incorporated by reference herein.

FIELD

The invention relates to an electric motor housing with cooling preferably fluid cooling containing a housing, wherein the housing has a round cross-section, an outer shell, a terminating wall and an inner shell, wherein the housing is formed as a one-piece lightweight metal cast component.

BACKGROUND

Electric motors generate heat during their power output. Especially in the case of electric motors in motor vehicles which output a high level of power, it is advantageous to cool these in order to ensure the efficiency of the electric motor. An overheating of an electric motor can also cause bearing damage such as damage to the winding.

Fluid-cooled housings for electric motors are usually constructed from at least two components. They generally have an inner cylindrical component, on the outside of which a spirally running cooling channel is arranged which is incorporated into the outside, for example, by means of mechanical machining or, in the case of a cast part, is already formed with such an outer structure.

In order to close the cooling channel, a further cylindrical component is attached concentrically to the outside and as a result the cooling channel is closed.

U.S. Pat. No. 8,183,723 B2 and DE 10 2015 109 121 A1 show such electric motor housings which are constructed of several parts.

It is disadvantageous in the case of the above-mentioned designs of an electric motor housing that the assembly outlay is high since sealing off must be performed on both face sides.

SUMMARY

In an embodiment, the present invention provides an electric motor housing with cooling, comprising: a housing, the housing having a round cross-section, an outer shell, a terminating wall and an inner shell, the housing comprising a one-piece lightweight metal cast component, wherein a cooling gap is formed between the outer shell and the inner shell and a spiral-shaped element is arranged in the cooling gap, and wherein the spiral-shaped element comprises a spiral-shaped cooling channel which runs between the windings of the spiral-shaped element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
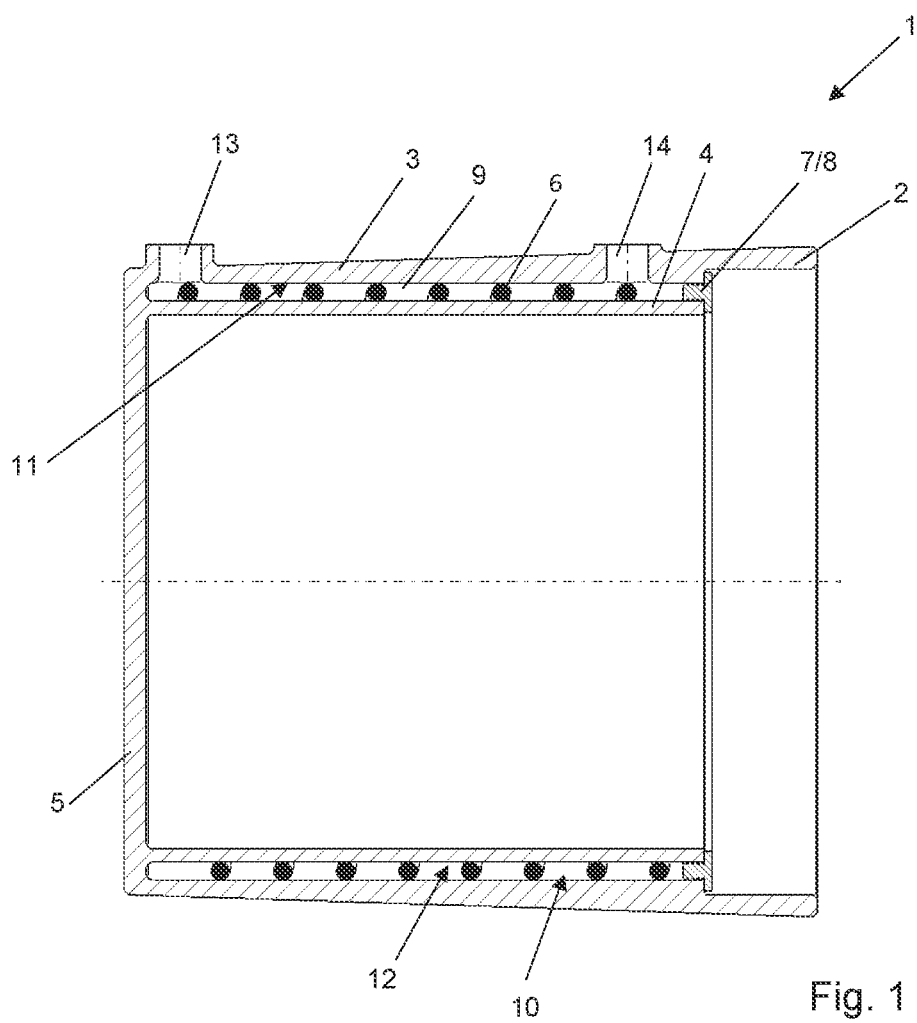
FIG. 1 shows a longitudinal section though an electric motor housing according to the invention.
Figure 2:
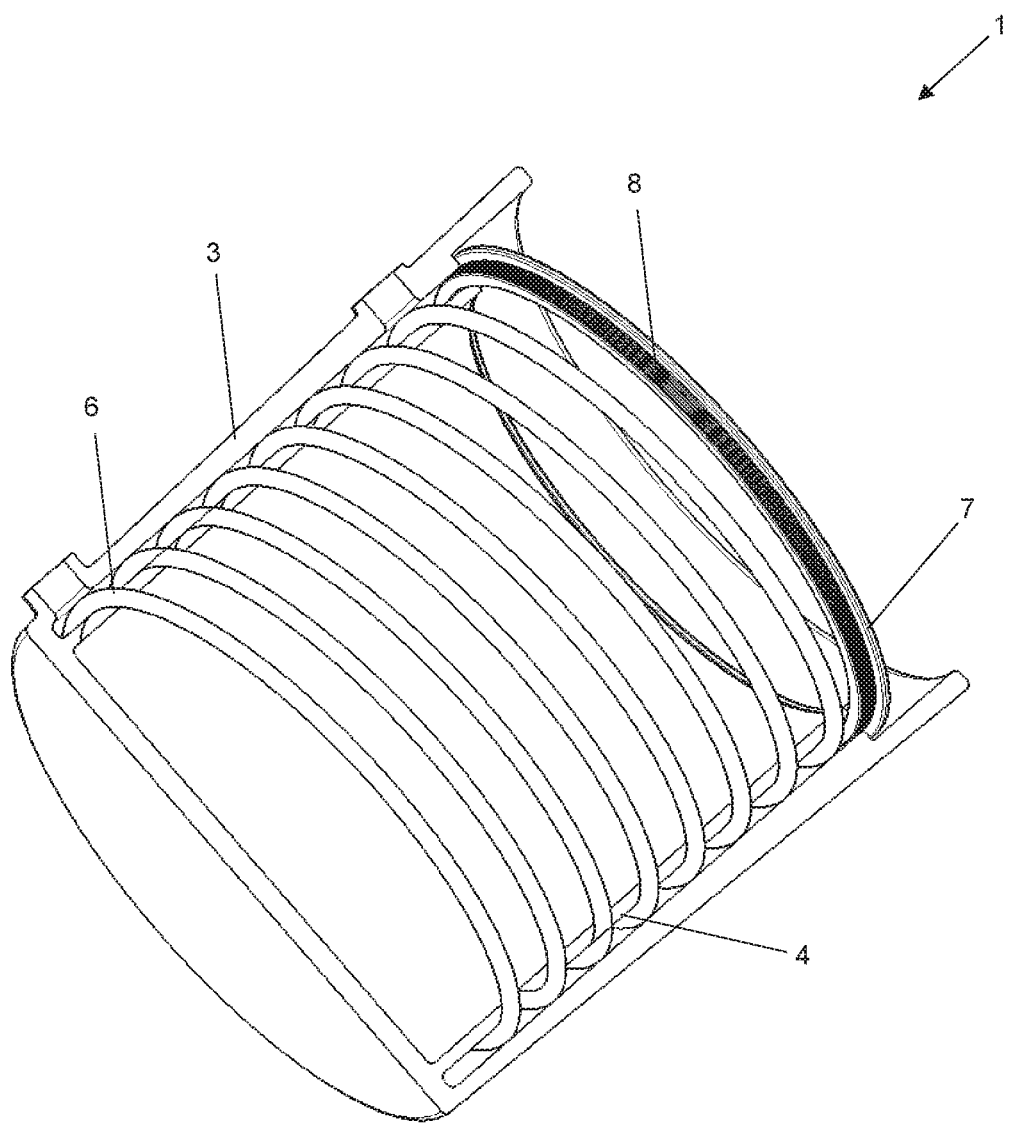
FIG. 2 shows a three-dimensional view of a section through an electric motor housing according to the invention.

In an embodiment, the present invention provides an electric motor housing which has few sealing points and thus also enables a short mounting time.

In an embodiment of the present invention a cooling gap is formed between the outer shell and the inner shell and a spiral-shaped element is arranged in the cooling gap, wherein the spiral-shaped element forms a spiral-shaped cooling channel which runs between the windings of the spiral-shaped element.

The electric motor housing according to the invention with fluid cooling has a round cross-section. The housing contains an outer shell, an inner shell and a terminating wall, wherein the housing is formed in one piece or integrally, as a result of which sealing points can be reduced. The housing is formed as a lightweight metal cast component, wherein it can be manufactured using the sand casting, chill casting or also the pressure die casting method.

There is a cooling gap between the outer shell and the inner shell of the housing. An element formed in a spiral-shaped manner is arranged therein. The spiral-shaped element extends from the terminating wall over the length of the inner shell, wherein the spiral-shaped element is arranged concentrically to the inner and outer shell. As a result of the arrangement of the spiral-shaped element in the cooling gap, a cooling channel is formed which runs in a spiral-shaped manner and which is defined by the spiral-shaped element, the outside of the inner wall and the inside of the outer wall. The windings of the spiral-shaped cooling element form the lateral delimitation of the cooling channel which runs in a spiral-shaped manner. The inside of the outer wall delimits the cooling channel to the outside and the outside of the inner wall delimits the cooling channel to the inside.

The spiral-shaped element is preferably formed as a separate part. As a result, it can easily be arranged in the cooling gap. It can furthermore be manufactured from a different material than the housing. The material of the spiral-shaped element can be as desired, wherein a metal or also a plastic is especially well suited.

It is preferred that the outer shell and the inner shell are arranged concentrically to one another. As a result, a cooling gap distributed evenly over the circumference is ensured.

It has been shown to be advantageous if the spiral-shaped element bears against the inner surface of the outer shell and the outer surface of the inner shell, as a result of which a closed spiral shaped cooling channel is formed. As a result, it is achieved that the cooling medium flows along the spiral-shaped cooling channel and prevents a flow exclusively in the axial direction at the circumference. As a result, a homogeneous temperature exchange or uniform cooling over the complete electric motor housing is ensured. The housing also becomes stiff since the outer shell is supported via the spiral-shaped element on the inner shell or the inner shell is supported via the spiral-shaped element on the outer shell.

It has been shown to be an advantageous embodiment if the cooling channel which runs in a spiral-shaped manner extends over the complete length of the inner shell. This ensures constant cooling over the electric motor housing.

It is advantageous if the outside of the inner shell and the inside of the outer shell are formed to be planar or flat. This ensures that the spiral-shaped element bears against the outside and inside and as a result a clear delimitation or a clear running of the cooling channel.

The electric motor housing preferably has a cover. The cover makes it possible for the cooling gap to represent a closed space.

It has been shown to be advantageous if the cover has a seal. This ensures that no cooling medium escapes from the cooling gap.

It has been shown to be a preferred embodiment if the spiral-shaped element and the cover are connected fixedly to one another, are preferably formed in one piece.

The inner shell preferably extends up to the cover and the cooling gap between the outer shell and the inner shell forms a closed space with an inlet and outlet for the cooling medium.

It is advantageous if the spiral-shaped element has a pretensioning. As a result, a fixed installation of the spiral-shaped element can be ensured without the spiral-shaped element being axially displaced or turning or rotating along the circumference. Alternatively, stops or fastening means can also be provided which prevent displacement or turning.

The housing of the electric motor housing according to the invention is manufactured by casting, preferably using the chill casting, sand casting or pressure die casting method.

An exemplary embodiment of the invention is described on the basis of the figures, wherein the invention is not only restricted to the exemplary embodiment.

Figure 3:
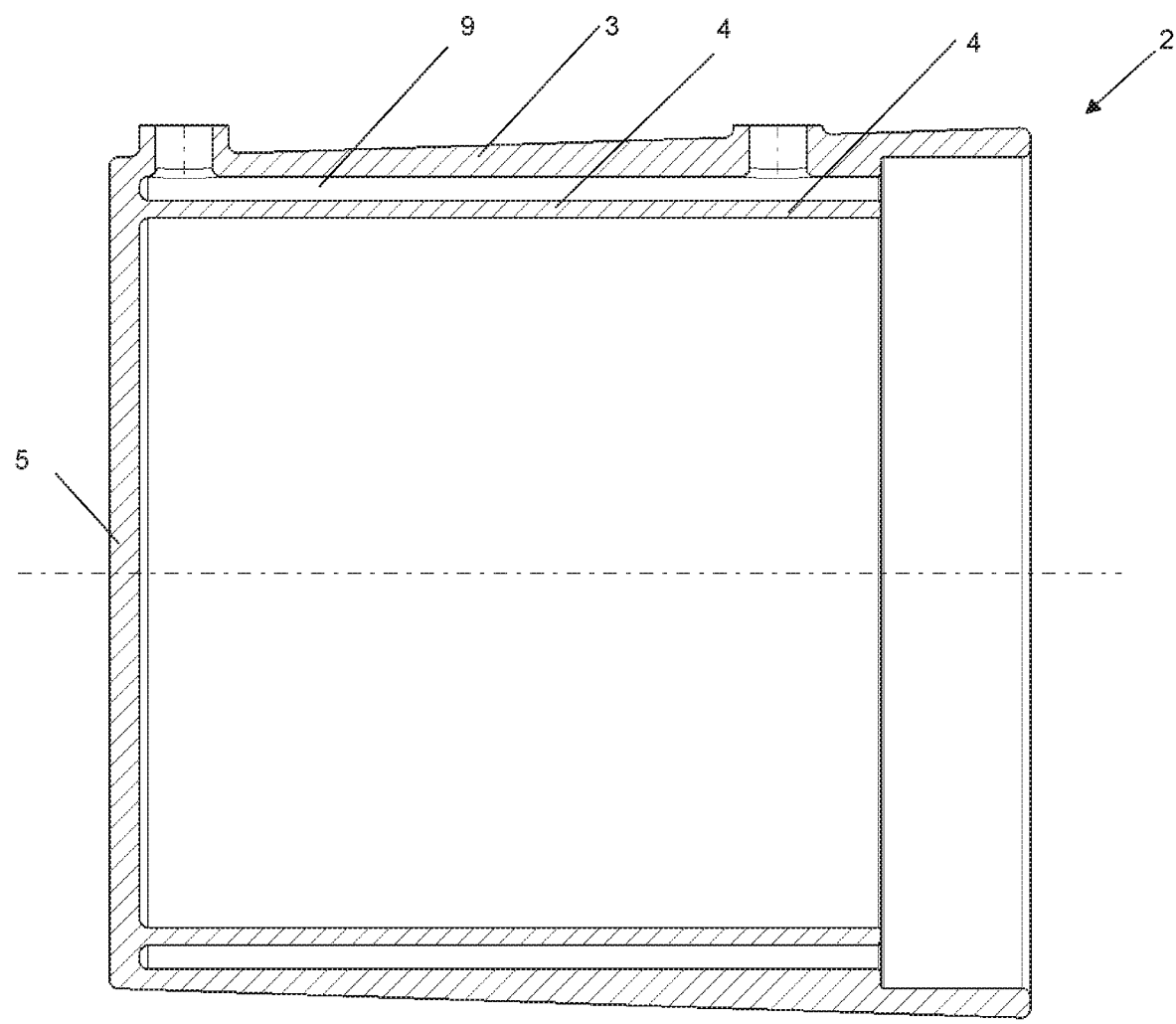
FIG. 3 shows a longitudinal section through a housing of the electric motor housing according to the invention.

The drawing represented in FIG. 1 shows a longitudinal section through an electric motor housing 1 according to the invention. It is clearly apparent that housing 2 is formed in one piece or integrally, which is also apparent in FIG. 3, where it is represented separately. Housing 2 has an outer shell 3, an inner shell 4 and a terminating wall 5. Outer shell 3 and inner shell 4 are arranged concentrically to one another and have a round cross-section, such as consequently housing 2. Inner shell 4 is arranged spaced apart from outer shell 3, as a result of which a cooling gap 9 is formed between inside 11 of outer shell 3 and outside 12 of the inner shell. A spiral-shaped element 6 which forms a cooling channel 10 running in a spiral shape is located arranged in cooling gap 9. Spiral-shaped element 6 is tangent to inside 11 of outer shell 3 and outside 12 of inner shell 4, as a result of which a closed cooling channel 10 which runs in a spiral-shaped manner is formed. Spiral-shaped element 6 preferably has a round cross-section, wherein, however, other forms such as rectangular, polygonal or oval, as well as forms which are not geometrically defined, are also conceivable. Spiral-shaped element 6 extends across the complete length of inner shell 4, spiral-shaped element 6 preferably has a pretensioning, spiral-shaped element 6 is thus not displaced and cooling channel 10 does not change or is not blocked. In order to provide a closed cooling gap 9 for the cooling medium, a cover 7 is arranged at the open end of inner shell 4, which cover 7 closes off cooling gap 9, wherein a seal 8 is preferably arranged in cover 7, which seal 8 ensures that no cooling medium can escape. Cover 9 and spiral-shaped element 6 can be formed as separate parts but also in one piece. Electric motor housing 1 is connected to a circuit for the cooling medium, which is why outer shell 3 has an inlet 13 and an outlet 14. The cooling medium flows in via inlet 13 and flows through cooling channel 10 and flows out via outlet 14.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Electric motor housing
2 Housing
3 Outer shell
4 Inner shell
5 Terminating wall
6 Spiral-shaped element
7 Cover
8 Seal
9 Cooling gap
10 Cooling channel
11 Inside outer wall
12 Outside inner wall
13 Inlet
14 Outlet

What is claimed is:

1. An electric motor housing with cooling, comprising:
a main body, the main body having a round cross-section, an outer shell, a terminating wall and an inner shell, the main body comprising a one-piece lightweight metal cast component,
wherein a cooling gap is formed between the outer shell and the inner shell and a spiral-shaped element is arranged in the cooling gap,
wherein the spiral-shaped element comprises one or more windings configured to externally delimitate a spiral-shaped cooling channel, and
wherein the spiral-shaped element is pretensioned and thus configured for fixed installation in the cooling gap without axial or rotational displacement thereafter.

2. The electric motor housing according to claim 1, wherein the spiral-shaped element comprises a part separate from the one-piece lightweight metal cast component of the main body.

3. The electric motor housing according to claim 1, wherein the outer shell and the inner shell are arranged concentrically to one another.

4. The electric motor housing according to claim 1, wherein the spiral-shaped element bears against an inner surface of the outer shell and an outer surface of the inner shell so as to form the spiral-shaped cooling channel as a closed spiral-shaped cooling channel.

5. The electric motor housing according to claim 4, wherein the closed spiral-shaped cooling channel extends over a complete length of the inner shell.

6. The electric motor housing according to claim 1, wherein an outside of the inner shell and an inside of the outer shell are planar or flat.

7. The electric motor housing according to claim 1, further comprising a cover at an open end of the cooling gap opposite the terminating wall.

8. The electric motor housing according to claim 7, wherein the cover has a seal configured to seal closed the open end of the cooling gap.

9. The electric motor housing according to claim 7, wherein the spiral-shaped element and the cover are connected fixedly to one another.

10. The electric motor housing according to claim 9, wherein the spiral-shaped element and the cover are a single integral piece.

11. The electric motor housing according to claim 7, wherein the inner shell extends up to the cover and the cooling gap between the outer shell and the inner shell forms a closed space with an inlet and outlet for passage of a cooling medium.

12. The electric motor housing according to claim 7, wherein the spiral-shaped cooling channel is further delimitated by the cover, the terminating wall, an inner surface of the outer shell, and an outer surface of the inner shell.

13. A method for producing the electric motor housing according to claim 1, comprising:
    producing the main body of the electric motor housing by casting.

14. The method according to claim 13, wherein the casting comprises pressure die casting.

15. The electric motor housing according to claim 1, wherein the spiral-shaped element has a solid full cross-section.

16. The electric motor housing according to claim 1, wherein the spiral-shaped cooling channel is configured for passage of a cooling medium external to the spiral-shaped element.

17. The electric motor housing according to claim 1, wherein the spiral-shaped cooling channel is configured for uniform spiral-shaped flow about an axis of the main body.

* * * * *